United States Patent [19]
Max et al.
[11] 3,710,438
[45] Jan. 16, 1973

[54] METHOD FOR MAKING MAGNETIC THIN FILM HEADS WITH MAGNETIC ANISOTROPY

[75] Inventors: Erhard Max, Sindelfingen; Dietrich Rogalla, Boeblingen, both of Germany

[73] Assignee: International Business Machines Corporation, Armonk, N.Y.

[22] Filed: Dec. 23, 1970

[21] Appl. No.: 100,991

[52] U.S. Cl. ....29/603, 179/100.2 C
[51] Int. Cl. ....G11b 5/42, H01f 7/06
[58] Field of Search ....29/603; 179/100.2 C; 346/74 MC; 340/174.1 F

[56] References Cited

UNITED STATES PATENTS

| | | | |
|---|---|---|---|
| 3,344,237 | 9/1967 | Gregg | 179/100.2 C |
| 3,564,521 | 2/1971 | Trimble et al. | 29/603 X |
| 3,564,558 | 2/1971 | Tolman et al. | 346/74 MC |
| 3,611,417 | 10/1971 | Sauter et al. | 179/100.2 CX |
| 3,271,751 | 9/1966 | Proebster | 340/174.1 |

FOREIGN PATENTS OR APPLICATIONS

| | | |
|---|---|---|
| 1,514,333 | 6/1969 | Germany |
| 1,166,263 | 10/1964 | Germany |

OTHER PUBLICATIONS

J. Hanak et al., Journal of Applied Physics, Feb. 1, 1968, pp. 1161, "Growth of Epitaxial Metal Oxide Films by Vapor–Solid Displacement Reaction"
J. E. Mee, IEEE Transaction on Magnetics, Sept. 1967, pp. 190, "Chemical Vapor Deposition of Epitaxial Garnet Films"

*Primary Examiner*—Charles W. Lanham
*Assistant Examiner*—Carl E. Hall
*Attorney*—Hanifin & Jancin and Gunter A. Hauptman

[57] ABSTRACT

A method for the batch fabrication of thin film magnetic heads with pole pieces having a preferred magnetic direction. The pole pieces are generated by growing, on a suitably oriented monocrystalline substrate, monocrystalline layers of zinc ferrite in zones corresponding to the respective geometrical form of the pole pieces, these layers having an inserted component (e.g. Ni) which renders the ferrite ferromagnetic. The Ni component may be added during the growing process or afterwards inserted in, or removed from homogeneous layers by a masked diffusion process.

9 Claims, 14 Drawing Figures

METHOD FOR MAKING MAGNETIC THIN FILM HEADS WITH MAGNETIC ANISOTROPY

BACKGROUND OF THE INVENTION

1. Field of the Invention

The invention relates to a method for making magnetic heads.

2. Description of the Prior Art

Generally, magnetic heads, for the writing-on and reading of magnetic tapes or magnetic storage discs containing digital information, are assembled of many individual parts. This process is expensive and no longer meets the demands made on magnetic systems by modern data processing machines. Thus, there is, on the one hand, the need for economical mass production and, on the other hand, the necessity of miniaturization owing to the continuously rising demands for higher storage density, i.e. for narrower and more closely packed magnetic tracks and shorter bit lengths. One of the consequences of the need for shorter bit lengths is that the writing and reading gap of the magnetic heads has to be reduced to a width of 1 micron approximately. At the same time, the ever increasing working speeds of the data processing machines demand that the upper frequency limit of the magnetic head which at present is 10 mhz approximately is increased, too.

In the prior art, for example German Pat. No. 1,166,263, pole pieces of the magnetic heads are designed as thin film elements with magnetic anisotropy and a tape-shaped conductive loop are arranged at a special angle to the magnetic preferential direction. The known magnetic head is made in such a manner that, on a glass or metal carrier, a layer consisting of a nickle-iron alloy is applied by vapor in the vacuum and that, at the same time, under the influence of a magnetic field, a magnetic preferential direction is generated in that vapor-deposited layer. After the application of an insulation layer onto the thus formed pole piece, the conductive loops are made by vapor-depositing a metallic layer. In this process, the geometrical structures of the individual layers are formed by etching off the corresponding layer.

The disadvantage of the prior art magnetic heads is that their pole surfaces consist of a relatively soft material. Irrespective of the increased wear, this presents difficulties in the necessary mechanical processing (polishing and lapping) of the sliding surfaces for the magnetic record carrier, especially because the magnetic properties of such magnetic materials can easily deteriorate through mechanical deformation. Furthermore, the relatively expensive manufacturing process during which respective parts of the vapor-deposited structures have to be etched off again is not favorable for the low-priced mass production, either.

SUMMARY OF THE INVENTION

The present invention provides a method for making magnetic thin film heads with magnetic preferential direction of the pole pieces, where the pole pieces are formed of a hard material suitable for later processing and having good wear characteristics, and which, owing to its simplicity, would be very suitable for mass production in the known technology of manufacturing integrated circuits.

The pole pieces are generated by growing monocrystalline layers of zinc ferrite on a monocrystalline substrate in zones corresponding to the respective geometrical form, with conductive loops being embedded therein, a component for rendering the ferrite ferromagnetic being inserted into the zinc ferrite. The crystal surface of the substrate is arranged in such a manner that the thus-formed magnetic preferential direction of the monocrystalline ferromagnetic ferrite adopts a predetermined direction with respect to the operation gap.

The process, as disclosed by the invention, is advantageously of such a nature that the monocrystalline Zn-ferrite layers are generated in a known manner by high temperature hydrolysis of chlorides or bromides of the corresponding components, or by oxidizing pyrolysis of oxalates or acethylacetonates of the corresponding components. A particular advantage of the method as disclosed in the invention is that the component rendering the monocrystalline zinc-ferrite layers ferromagnetic is formed of nickel or manganese and is either applied in the form of a corresponding compound with the generative substances upon the growing of the monocrystalline zinc-ferrite film, or is subsequently inserted by diffusion into the formed Zn-ferrite layer. The process as disclosed by the invention is advantageously designed in such a manner that a Spinell single crystal is used as a substrate for the forming of the pole pieces, on which crystal, upon a surface suitably oriented with respect to crystallography, the growing of the monocrystalline Zn-ferrite layer is effected.

An advantageous embodiment of the process as disclosed by the invention is characterized in that a first monocrystalline, ferromagnetic Ni-Zn ferrite layer is grown on the monocrystalline substrate by means of a mask exposing the pole piece zones, that subsequently the conductive loops are applied, and that then, again using a mask exposing the pole pieces a second monocrystalline ferromagnetic ferrite layer, covering the conductive loop in the range of the operation gap and joining the first ferrite layer, is grown.

In another embodiment of the process as disclosed by the invention, a continuous, monocrystalline Zn-ferrite layer is applied on the monocrystalline substrate in a first step. Subsequently, the pole piece zones are exposed by means of an $SiO_2$ mask applied onto the Zn-ferrite layer, and Ni or Mn is diffused into these zones. After applying the conductive loops, growing of the Zn-ferrite layer and the diffusion of Ni or Mn by means of another $SiO_2$ mask in the pole piece zones is repeated.

In another embodiment of the process, a continuous, monocrystalline, ferromagnetic Ni-Zn ferrite layer is applied in a first step onto the monocrystalline substrate; then, with the zones surrounding the pole pieces exposed by means of an $SiO_2$ mask applied onto the ferrite layer, the ferromagnetic properties are rendered ineffective in these zones by diffusing Zn. After applying conductive loops, growing of the Ni-Zn ferrite layer and diffusion of Zn into the zones surrounding the pole pieces by means of an $SiO_2$ mask for forming the ferromagnetic pole piece zones is repeated.

It is an advantage of the inventive process that the conductive loops of the magnetic heads are applied by the vapor-deposition of noble metals onto a ferrite layer covered by masks. The inventive process is especially suitable for the mass production of magnetic heads formed on a Spinell single crystal substrate which is separated, after the magnetic heads have been made, into smaller individual units as needed.

The foregoing and other features and advantages of the invention will be apparent from the following more particular description of preferred embodiments of the invention, as illustrated in the accompanying drawings.

DESCRIPTION OF THE PREFERRED EMBODIMENTS

Figure 1A:
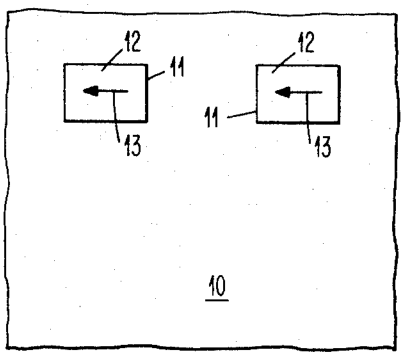
FIGS. 1*a* through 1*c* are successive plan views showing a substrate on which thin film layers are sequentially arranged.

Referring to FIG. 1*a*, there is provided a monocrystalline substrate 10 on which, in a mass production process, a very high number of magnetic heads are produced simultaneously. A predetermined number of the serially-arranged magnetic heads is placed on the substrate surface. The substrate 10 is a Spinell monocrystal which, to give an example, is cut in such a manner that its surface forms a plane. A sapphire monocrystal can also be used as substrate for the growing of magnetic head layers.

A mask is applied onto substrate 10 exposing, in small rectangular zones 11 in which the pole shoes of the magnetic head are to be formed, the surface of crystal 10. This mask can be made in a manner known in the art by a metal die or by an $SiO_2$ layer applied by a photolithographic process. Onto the exposed zones of the thus masked substrate, a monocrystalline, ferromagnetic zinc-ferrite layer 12 is grown in a reaction vessel. The monocrystalline growth is effected either by high temperature hydrolysis of chlorides or bromides of Zn, Fe, or Ni, or by oxidizing pyrolysis of the oxalates or acethylacetonates of these metals. Instead of nickel, it is equally possible to use manganese. A monocrystalline Zn-ferrite without added Ni or Mn and grown in accordance with one of these processes is not ferromagnetic per se and does not have magnetic anisotropy. If, however, nickel or manganese is added to the initial substances in the forming of the monocrystalline growth, or if it is inserted subsequently into the already-formed monocrystalline layer, the monocrystalline Zn-ferrite layer formed becomes ferromagnetic and has a magnetic preferential direction indicated by arrows 13. The monocrystalline ferromagnetic layer 12 is grown in a thickness of 10 microns approximately. Then, by means of another mask, the zones of the conductive loops are exposed and the conductive loops 14 are applied by vapor-deposition of noble metal, e.g. of platinum, in a thin film.

Figure 1B:
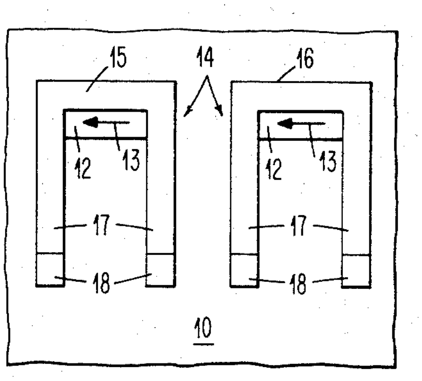

Referring to FIG. 1*b*, the conductive loops 14 are U-shaped having a bend 15 covering the ferromagnetic zones 12 and partly forming a mutual edge 16 which, after the completion of the magnetic head, limits the transport surface adjacent to the record carrier. Free legs 17 of the conductive loops lead to contact connections 18.

Figure 1C:
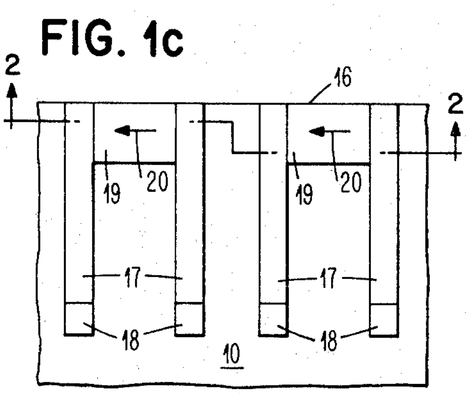

Referring to FIG. 1*c*, after vapor-deposition of the conductive loops, another mask exposing the zones 11 is applied onto substrate 10. A monocrystalline ferromagnetic Ni-Zn-ferrite layer 19 is grown on these zones to cover the conductive loops 14 in the pole piece area 15 and join the first Ni-Zn-ferrite layer 12, forming a monocrystalline film with a magnetic preferential direction indicated by arrows 20. Then, the substrate 10 is ground along edge 16. Thus, the bend 15 of the conductive loop 14 is surrounded by an operational gap, comprising a ferromagnetic pole shoe with magnetic preferential direction.

Figure 2:
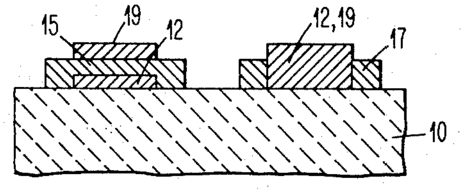
FIG. 2 is a sectional view taken along line 2—2 of FIG. 1*c;*

Another embodiment of the magnetic head manufacturing process is shown in FIGS. 3*a* through 3*d* corresponding to the section 2—2 in FIG. 1*c*. Compared with the method of the first embodiment, this process differs particularly in that the layers grown on the monocrystalline substrate and forming the magnetic head are always embedded in other layers. In this manner, irregular elevations on the substrate 10 which could cause a flattening of the vertical edges (which is possible in the embodiment of FIG. 2) can be avoided.

Figure 3A:
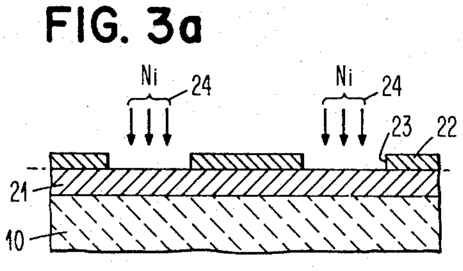
FIGS. 3*a* through 3*d* are sectional views along line 2—2 of FIG. 1*c*, showing the procedural steps of a second embodiment of the magnetic head manufacturing process.

Referring to FIG. 3*a*, a monocrystalline Zn-ferrite layer 21 is first grown onto the entire surface of the Spinell monocrystal substrate 10. As already mentioned above, this layer is not ferromagnetic and does not have a magnetic preferential direction. An $SiO_2$ layer 22 is applied onto the ferrite film 21 by means of pyrolysis, vapor-deposition, or by cathode spattering. Subsequently, by means of photolithography and etching, the geometrical structure of the first magnetic layer is removed from the $SiO_2$ layer 22. The thus-formed apertures 23 serve as windows for the subsequent diffusion of Ni vapor 24 into the exposed Zn-ferrite film 21.

Figure 3B:
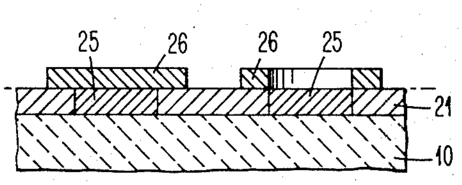

Referring to FIG. 3*b*, Ni-Zn-ferrite is generated in this process in the zones 25 limited by apertures 23, said ferrite having ferromagnetic properties and a magnetic preferential direction since it is a single crystal. After the diffusion of Ni, the $SiO_2$ layer 22 is etched off completely. Then the layer of noble metal, e.g. platinum, which forms the conductive loops 26 is applied, with the help of a mask, onto the Zn-ferrite layer 21 which now contains the magnetic zones 25. These conductive loops correspond to the conductive loops 14 of FIG. 1*b*.

Figure 3C:
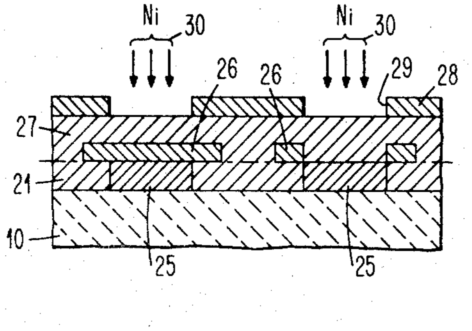
Figure 3D:
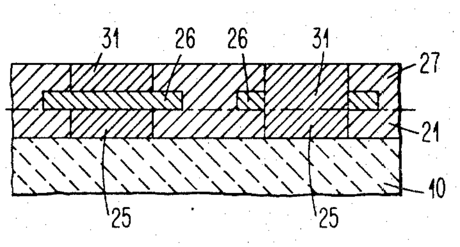
Figure 4A:
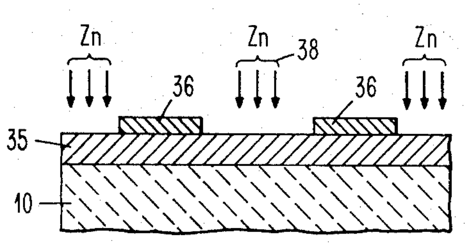
FIGS. 4*a* through 4*d* are sectional views along line 2—2 in FIG. 1c for explaining the procedural steps of a third embodiment of the magnetic head manufacturing process.
Figure 4B:
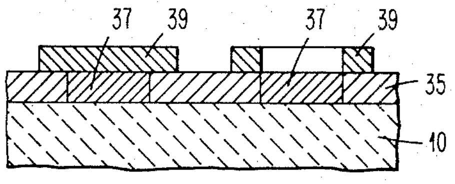
Figure 4C:
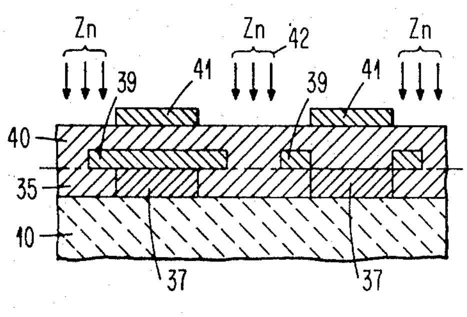
Figure 4D:
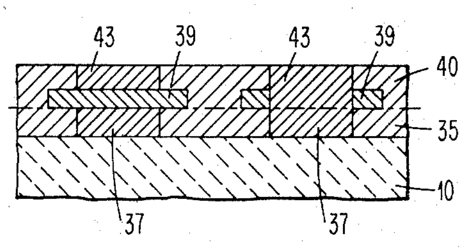

Referring to FIG. 3*c*, a Zn-ferrite layer 27 is now applied onto the monocrystalline Zn-ferrite layer 21, including the ferromagnetic zones 25 and the conductive loops 26, in accordance with one of the above-mentioned processes. The layer 27 continues to grow on the already formed Zn-ferrite layer in monocrystalline form, and also covers the conductive loops as monocrystalline separation. Subsequently, a $SiO_2$ layer 28 is applied onto the Zn-ferrite layer 27, out of which $SiO_2$ layer the windows 29 in the zones over the ferromagnetic zones 25 are etched by means of photolithography and etching. Now, the exposed zones 29 are again subjected to an Ni-vapor 30 and heated to a corresponding temperature, in such a manner that Ni is diffused into the Zn-ferrite layer and magnetic zones 31 are formed which, with the magnetic fields 25, form a uniform pole piece with a magnetic preferential direction, as shown in FIG. 3*d*. After removal of the $SiO_2$ layer 28, application of a suitable protective layer, if necessary, and grinding-off of the transport surface (along edge 16, shown in FIG. 1*c*), the integrated multiple magnetic head is completed. Each element has one conductive loop consisting of one winding and is surrounded by a pole piece with a magnetic preferential direction.

Another embodiment of the magnetic head manufacturing process is shown in FIGS. 4*a* through 4*d*. This method resembles the embodiment shown in FIGS. 3*a* through 3*d*, with the difference that a monocrystalline, ferromagnetic Ni-Zn-ferrite layer 35 is grown on the entire surface of the monocrystalline substrate 10 in a first step. Onto this layer, a $SiO_2$ mask 36 is again applied, but in such a manner that the pole piece fields 37 are covered by the mask and that their surroundings are exposed. As indicated by arrows 38, Zn is diffused into layer 35 through the masked surface in such a manner that the respective zones lose their ferromagnetic properties and are maintained in the pole piece zones 37 only. After removal of the $SiO_2$ layer 36, the conductive loops 39 are vapor-deposited as in the above-given embodiment. Subsequently, a monocrystalline Ni-Zn-ferrite layer 40 is again grown on the entire surface. Layer 40 is covered by a $SiO_2$ mask 41 in the pole piece zones, so that upon the subsequent diffusion of Zn 42, only the zones surrounding the pole piece fields are demagnitized. After the etching-off of the mask layer 41, ferromagnetic zones 43 are produced out of layer 40, said zones joining the ferromagnetic zones 37 to form the pole pieces. Thus, the same geometrical structure is achieved for the magnetic head as shown in the above embodiment, so that the magnetic head arrangement, as in the present case, can be completed by a coating with a protective film, if necessary, and a grinding of the transport surface along edge 16 in FIG. 1*b*.

Figure 5:
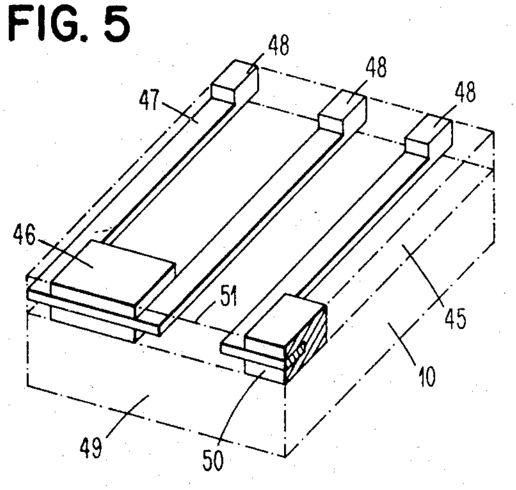
FIGS. 5 and 6 are perspective views of a magnetic head section with different gaps.

An integrated multiple magnetic head made in this manner is shown in perspective view in FIG. 5. The substrate 10 formed by the Spinell monocrystal, as well as the monocrystalline Zn-ferrite layer 45 grown thereon are indicated by broken lines. The pole pieces 46 consisting of Ni-containing, ferromagnetic zones in the Zn-ferrite layer surround the U-shaped conductive loops 47 in their bent part, whereas the free ends of the conductive loops lead to the connecting elements 48. The front side 49 of the substrate forming the sliding surface of the record carrier is ground flush with the pole surfaces 50 forming the operational gap. The magnetic circle is closed by the leakage field induced in the record carrier. The upper edge 51 of this surface corresponds to edge 16 in FIG. 1*c*.

Figure 6:
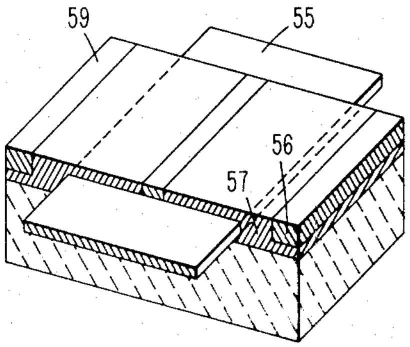

Another embodiment of an integrated multiple magnetic head which can be made by the above-described procedural steps in a different order, is shown in FIG. 6 in an enlarged section. The conductive loop 55 is fully embedded in the grown monocrystalline layer 56. The part of layer 56 below the conductive loop 55 has been applied as ferromagnetic Ni-Zn-ferfite. The part of layer 56 above the conductive loop, however, has been applied as non-ferromagnetic Zn-ferrite and subsequently rendered ferromagnetic by the diffusion of Ni in the pole piece field 57, the gap range having been covered for that purpose. In that case, the surface 59 forms the sliding surface of the magnetic record carrier.

In order to allow the simplification of the description, the embodiments specified refer to magnetic heads with one conductive loop. By repeatedly executing the corresponding procedural steps, it is, of course, possible to also produce magnetic heads with several conductive loops with or without tapping.

While the invention has been particularly shown and described with reference to preferred embodiments thereof, it will be understood by those skilled in the art that various changes in form and details may be made therein without departing from the spirit and scope of the invention.

What is claimed is:

1. A method for making magnetic heads for reading and writing of digital signals stored on a magnetic surface, having pole pieces in the form of magnetic thin film elements with axial anisotropy which define an operation gap and surround a number of conductive loops, comprising the steps of generating a number of serially arranged pole pieces by:

1. growing in zones, each zone defining a desired geometrical form on a monocrystalline substrate, a number of superposed monocrystalline layers of zinc ferrite for each pole piece;
   2. embedding conductive loops in said layers; and
   3. rendering the ferrite ferromagnetic by inserting a component into the zinc ferrite; the crystal surface of the substrate being arranged in such a manner that the magnetic preferential direction of the monocrystalline ferromagnetic ferrite thus formed adopts a predetermined direction with respect to the operation gap.

2. The method claimed in claim 1, wherein the monocrystalline zinc-ferrite layers are generated by high temperature hydrolysis of a compound selected from the class consisting of the chlorides and bromides of said component.

3. The method of claim 2, wherein the component rendering the monocrystalline zinc-ferrite layers ferromagnetic is selected from the class consisting of nickel and manganese, said component being applied while growing the monocrystalline zinc-ferrite film, and then subsequently diffusing said component into said film.

4. The method of claim 3, wherein growth of the monocrystalline zinc-ferrite layer is effected on a Spinell single crystal substrate having a surface suitably oriented with respect to the preferred crystallography.

5. The method of claim 4, further comprising the steps of:

producing a first monocrystalline ferromagnetic nickel-zinc ferrite layer by growing said layer on said monocrystalline substrate through a mask defining the pole piece zones;

subsequently applying conductive loops; and growing a second monocrystalline ferromagnetic ferrite layer on said first layer to cover the conductive loop in the region of the operation gap by means of a mask defining the pole pieces.

6. The method of claim 4, further comprising the steps of:

applying a continuous, monocrystalline zinc-ferrite layer to a monocrystalline substrate;

defining pole piece zones by means of a silicon dioxide mask applied onto the zinc-ferrite layer;

diffusing nickel or manganese into aforesaid zones;

applying conductive loops;

growing a zinc-ferrite layer; and diffusing, through another silicon dioxide mask, a component from the class consisting of nickel and manganese in the pole piece zones.

7. The method of claim 4, further comprising the steps of:

applying a continuous, monocrystalline, ferromagnetic nickel-zinc ferrite layer onto a monocrystalline substrate;

exposing the zones surrounding the pole pieces by means of a first silicon dioxide mask applied onto the ferrite layer;

rendering the ferromagnetic properties ineffective in these zones by diffusing zinc;

applying a conductive loop;

growing a nickel-zinc ferrite layer; and diffusing, through a second silicon dioxide mask, zinc into the zones surrounding the pole pieces.

8. The method of claim 7, wherein the conductive loops of the magnetic heads are applied by the vapordeposition of nobel metals onto the ferrite layer through masks.

9. The method of claim 8, wherein a plurality of magnetic heads are made on a Spinell single crystal, forming the substrate, the crystal being separated, after the magnetic heads have been made, into smaller individual units.

* * * * *